Sept 10, 1957 H. C. OLDFIELD 2,805,508
FISHING ROD HANDLE ASSEMBLY
Filed Nov. 12, 1954 2 Sheets-Sheet 1
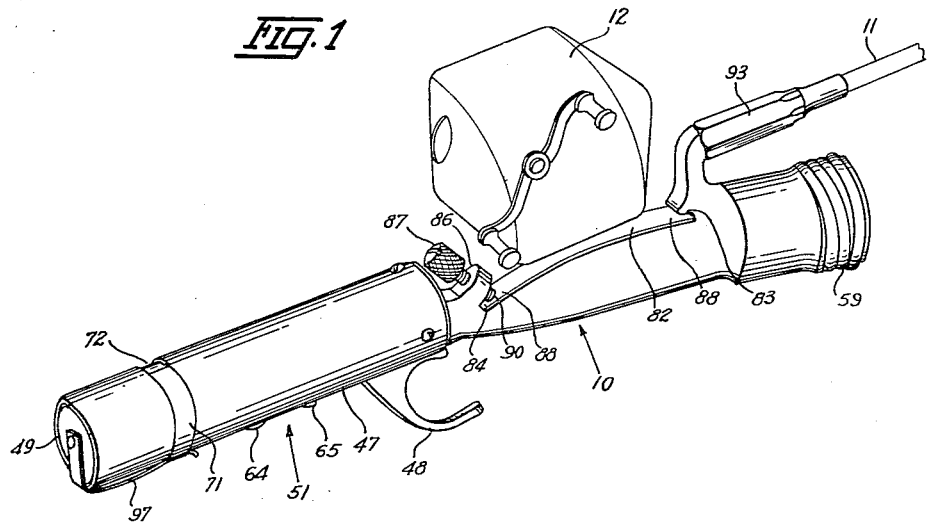
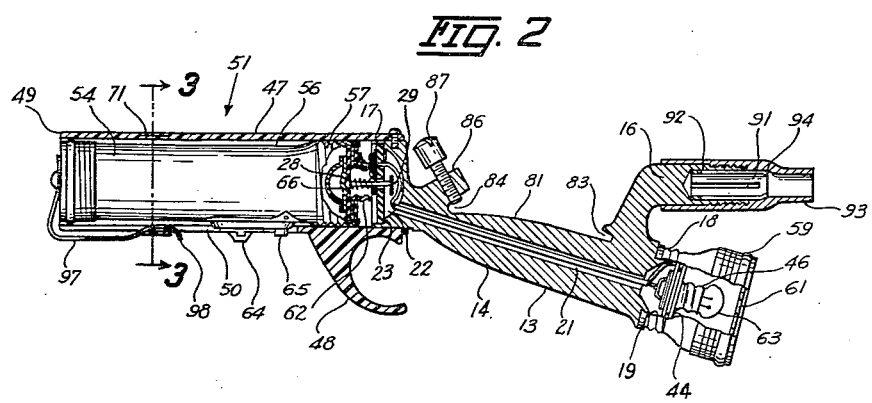
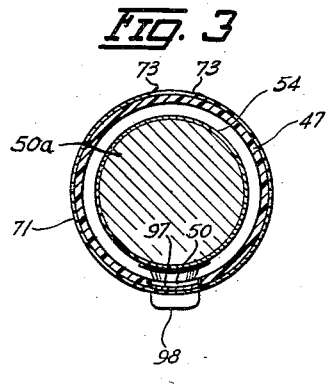
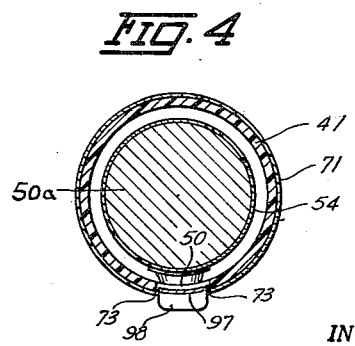
INVENTOR.
HAROLD C. OLDFIELD
BY
ATTORNEY.

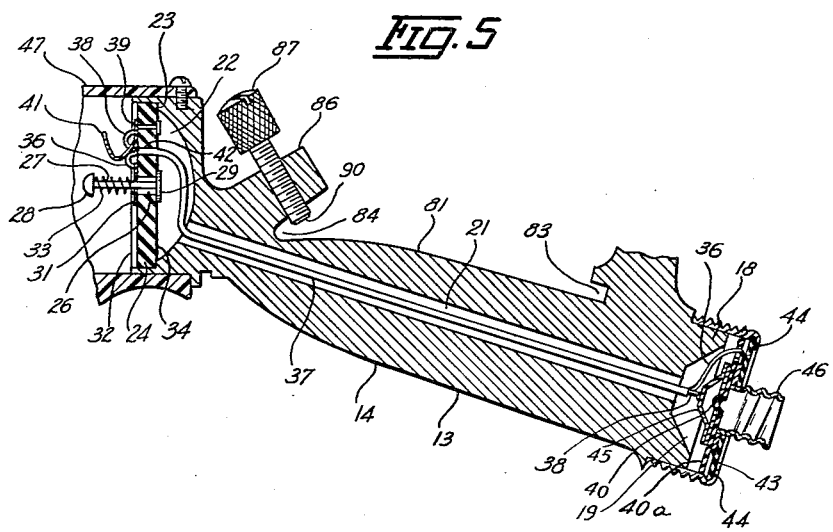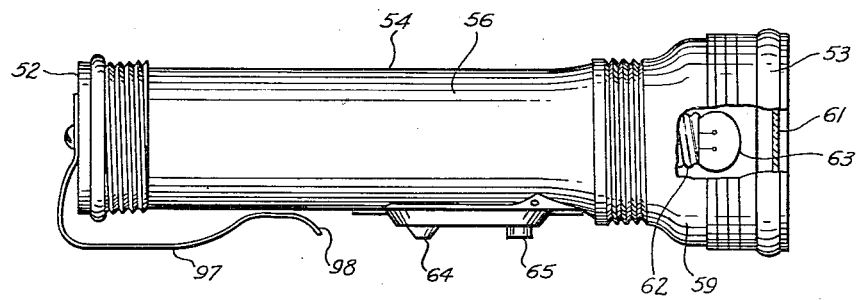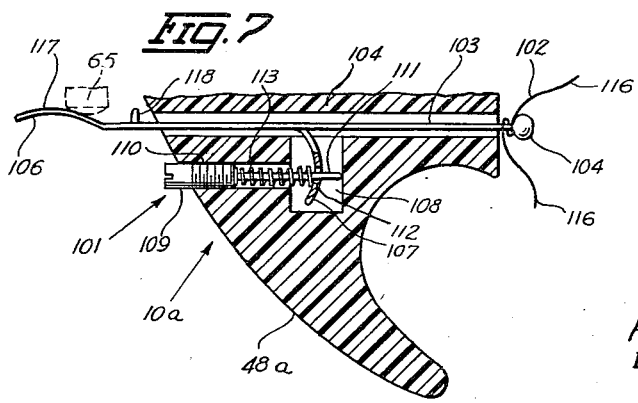

United States Patent Office 2,805,508
Patented Sept. 10, 1957

2,805,508

FISHING ROD HANDLE ASSEMBLY

Harold C. Oldfield, Des Moines, Iowa

Application November 12, 1954, Serial No. 468,396

1 Claim. (Cl. 43—17)

This invention relates generally to fishing rods and more particularly to a fishing rod handle assembly which includes a light.

When fishing at night, some form of light is required for determining the location of the cast line, baiting the hook or otherwise manipulating the fishing tackle, landing the fish, and numerous other phases of a fishing operation. Heretofore, it has been necessary for the fisherman to attempt to concurrently operate both his fishing equipment and a separate light, with the end result being that one or the other or both are unsatisfactorily operated.

An object of this invention, therefore, is to provide an improved fishing rod handle assembly having a light so that the fishing rod and light can be successfully concurrently operated.

A further object of this invention is to provide a fishing rod handle with a flashlight which is removably assembled on the handle so that it can be detached and used separately when desired.

Another object of this invention is to provide a fishing rod handle with a light which is adapted to be directed downwardly and forwardly from the handle for illuminating the fish line or other desired portions of a lake or stream.

A further object of this invention is to provide a fishing rod handle and flashlight assembly which is light and rugged in construction, economical to manufacture and readily operable during fishing.

Further objects, features, and advantages of this invention will become apparent from a consideration of the following description when taken in connection with the accompanying drawing in which:

Fig. 1 is a fragmentary perspective view of a fishing rod equipped with the handle and flashlight assembly of this invention;

Fig. 2 is a longitudinal sectional view of the fishing rod handle and flashlight assembly shown in Fig. 1;

Fig. 3 is an enlarged transverse sectional view as seen along the line 3—3 of Fig. 2, showing the flashlight clamping ring for the assembly of this invention in a clamping position for holding the flashlight in the handle;

Fig. 4 is an enlarged transverse sectional view, similar to Fig. 3, showing the clamping ring in a released position for permitting removal of the flashlight from the fishing rod handle.

Fig. 5 is an enlarged fragmentary sectional view of a portion of the handle assembly;

Fig. 6 is a side elevational view of the flashlight for the handle assembly; and Fig. 7 is a longitudinal sectional view of a modified form of handle which includes means for actuating the flashlight in response to a pull on the fish line.

With reference to the drawing, the fishing rod handle and flashlight assembly of this invention, indicated generally at 10, is illustrated in Fig. 1 in assembly relation with a fishing rod 11, only a portion of which is shown, and a reel 12. The assembly 10 (Figs. 2 and 5) consists of a metal body or base member 13 having an inclined intermediate section 14 laterally offset from a cylindrical front end section 16 and a cylindrical rear end section 17 which are arranged in a substantially co-axial relation. The intermediate section 14 has a forward extension 18 of a cylindrical shape formed with a central cavity 19.

A passage 21, extended longitudinally of the intermediate section 14, communicates at its forward end with the cavity 19 and at its rear end with a cavity 22 formed in the body member rear end section 17. The cavity 22 is of a shape to form an annular shoulder 23 on the inner surface of the rear end section 17, and positioned within the cavity 22 to a stop position against the shoulder 23 is a relatively thin insulating disc 24 (Fig. 5).

Extended through a central opening 26 in the disc 24 is a contact rod 27 having an enlarged rear end portion or head 28. The rod 27 is secured at its opposite end to a transverse stop plate 29 positioned within the cavity 22 and against the front side 34 of the disc 24 in the position of the rod 27 shown in Fig. 5. An annular plate 31, formed of a conducting metal is carried on the rear side 32 of the disc 24 at a position about the contact rod 27. Coiled about the rod 27 and extended between the head 28 on the rod 27 and the conductor plate 31, is a compression spring 33 which exerts a pressure on the head 28 acting to move the rod 27 in a rearward direction so that the plate 29 is moved into contact with the front side 34 of the disc 24. One end of one of the leads 36 of a flexible conductor 37 is soldered to the conductor plate 31 with the other lead 38 for the conductor 37 being soldered to a U-shape flexible contact plate 39 carried on the rear side 32 of the disc 24 in a spaced relation with the contact rod 27. The flexible contact 39 includes a leg portion 41 which is curved in a direction away from the contact rod 27 for a purpose to appear later.

The flexible conductor 37 (Fig. 5) extends through an opening 42 in the insulator disc 24, through the cavity 22, and the passage 21 to the cavity 19 in the extension 18 for the body member 13. The conductor lead 36 is connected to a metal strip 43 extended about a socket 46 carried by a cap member 44 removably positioned about the extension 18.

The other lead 38 is connected, by means of a conductor strip 45, to a contact 40 at the base of a socket 46 carried by the cap 44. An annular insulating disc 40a separates the contact 40 and the socket 46.

It is seen, therefore, that by virtue of the flexible conductor 37 extended between the contacts 27 and 39 carried on the insulating disc 24 and the contact 40 and the light bulb socket 46, a bulb positioned in the socket 46 in engagement with the contact 40 is electrically connected with the contacts 27 and 39.

Positioned about and extended rearwardly from the body member rear end section 17 is a tubular hand grip or handle member 47, constructed of a light weight plastic material such as Lucite, provided on its lower side with a finger grip extension 48. As best appears in Fig. 2, the handle 47 is formed along its under side with a slot 50 which extends from the rear end 49 of the handle 47 to a position slightly rearwardly of the finger grip 48 for a purpose to appear later.

Assembled with the body member 13 and the handle 47, which together constitute a handle assembly 51 for the fishing rod 11, is a flashlight 52 (Fig. 6) which includes a bulb and lens assembly 53 and a barrel and battery assembly 54. The flashlight 52 is of well known construction, having a barrel 56 provided with an externally threaded front end portion 57 (Fig. 2) which threadably receives a sleeve 59 which carries the flashlight lens 61. The front end 57 of the barrel 56 carries the usual socket 62 for a bulb 63.

In the assembly of the flashlight 52 with the handle assembly 51 (Fig. 2), the sleeve 59 which carries the lens 61 is detached from the barrel 56 which carries the flashlight batteries 50a (Figs. 3 and 4), and the bulb 63 is similarly removed. The flashlight battery and barrel assembly 54 is then positioned within the handle member 47, with the barrel 56 being of a size such that it is only slightly smaller than the inner diameter of the handle 47.

During movement of the assembly 54 within the handle 47, the flashlight operating or switch buttons 64 and 65 move within the slot 50 and project outwardly of the handle 47. The button 64 is of the usual sliding type while the button 65 is of the plunger type and must be held down to maintain the flashlight on.

The assembly 54 is moved forwardly within the handle 47 until the contact 66 at the base of the socket 62 is engaged with the head 28 of the contact rod 27, which is then moved forwardly, against the action of the compression spring 33, to a position such that the socket 62 contacts the flexible contact 39 carried by the insulating disc 24. The outwardly curved free end portion 41 of the flexible contact 39 insures a positive contact of the outer side of the socket 62 with the contact 39.

For maintaining the flashlight barrel and battery assembly 54 in this position within the hand grip 47, a split clamping ring 71 (Figs. 2, 3, and 4) is positioned about the handle 47. The ring 71, which is initially formed of a smaller diameter than the handle 47, slides in a recessed groove or track 72 about the outer surface of the handle 47. As shown in Fig. 4, when the ring 71 is manipulated in the track 72 so that the ends 73 of the ring 71 are on opposite sides of the slot 50, the flashlight barrel assembly 54 is movable into and out of the handle 47 with the operating buttons traveling in the handle slot 50. Movement of the ring 71 to a position extended across the slot 50 (Fig. 3) operates, by virtue of the smaller diameter of the ring 71, to squeeze the portions of the handle 47 on opposite sides of the slot 50 together to decrease the diameter of the handle 47 and thereby positively clamp the assembly 54 in the handle grip 47.

Also, and as best appears in Fig. 2, the ring 71 extends across the slot 50 at a position rearwardly of the outwardly curved front end 98 of a spring clip 97 carried on the flashlight barrel assembly 54 to positively prevent withdrawal of the assembly 54 from the handle 47 in the clamping position of the ring 71 shown in Fig. 3. The clip 97 facilitates the separate carrying, on a belt or the like, of the flashlight 52 when the same is detached from the handle assembly 51. The assembly of the flashlight 52 with the handle assembly 51 is completed by inserting the bulb 63 in the socket 46 carried by the projected end 18 of the body member intermediate portion 14, with the base of the bulb 63 in engagement with the contact 40 at the base of the socket 46. The collar 59 which carries the flashlight lens 61 is then threaded about the cap 44 which carries the socket 46.

It is seen, therefore, that by virtue of the connection of the flashlight socket 46 and the bulb 63 by means of the conductor 37, the bulb 63 is turned off and on merely by manipulation of one of the operating buttons 64 and 65.

As best appears in Fig. 2, the top surface 81 of the body member intermediate portion 14 is curved to fit the curvature of a supporting plate 82 for the reel 12. Recesses 83 and 84 formed in the intermediate portion 14 at the front and rear ends respectively of the curved surface 81, receive the ends 88 of the plate 82.

An ear 86 formed on the body member 13 at a position adjacent to and above the recess 84 carries a downwardly and forwardly inclined threaded clamping member 87, the lower end 90 of which is engageable with the plate 82 to clamp the rear end of the plate 82 against the surface 81. By virtue of the complementary curvatures of the reel support plate 82 and the top surface 81 of the body member intermediate portion 14, which functions as a reel seat, the front end of the reel support 82 is forced into the recess 83 when the member 87 is engaged with the opposite end of the plate 82. It can thus be seen that on downward movement of the clamping member 87, both the front and rear ends of the support plate 82 are securely held against the reel seat 81.

The fishing rod 11 is supported on the body member 13 by means of a split clamping ring 91 received in a cavity 92 formed in the front end portion 16 of the body member 13. With the end of the fishing rod 11 received in the sleeve 91 a clamping collar 93 having a tapered inner surface portion 94 is threaded on the front end portion 16 so as to reduce the diameter of the clamping sleeve 91 and thereby securely lamp the fishing rod 11 within the sleeve.

In use, applicant's flashlight and handle assembly 10 facilitates a night fishing operation by providing for a readily obtained beam of light from the bulb 63, when desired, by merely manipulating one of the flashlight buttons 64 and 65 which are conveniently positioned adjacent the finger extension 48. As best appears in Fig. 2 the handle 47 and the rod 11 are substantially coaxial or in line with each other, with the bulb 63 being below the rod 11 and inclined downwardly and forwardly relative to the rod 11. As a result, a beam of light from the flashlight bulb 63 is directed toward the location of th fish line in the water. During the daytime, when the flashlight 52 is not required, or when it is desired to use the flashlight 52 separately, the flashlight barrel and battery assembly 54 are readily detached from the handle assembly 51 merely by manipulating the clamping ring 71. Likewise, the lens carrying sleeve 59 and the bulb 63 are readily detached from the body member portion 18 for assembly on the front end 57 of the barrel and battery assembly 54. A protective cap or housing (not shown) may be threaded on the socket carrying cap 44 for enclosing the socket 46 to protect the socket and contact 40 against becoming wet or dirty when the flashlight 5 is detached from the assembly 51.

In the modified form of assembly 10a, illustrated in Fig. 7, like numerals are used to indicate like structure in the assembly 10. The assembly 10a includes a spring device, indicated generally at 101, mounted on a finger extension 48a for the handle 47 for automatically actuating the flashlight button 65 in response to a pull on the fishline 102.

The device 101 includes a flat elongated bar 103 positioned in an opening or slot 104 extended longitudinally through the extension 48a. The bar 103 has a knob 104 at its front end, an upwardly curved section 106 at its rear end, and is provided intermediate its ends with a downwardly extended leg 107 positioned within an upright cavity 108 formed in the extension 48a, below and in communication with the opening 104.

A screw 109, threaded into an opening 110 in the rear side of the extension 48, carries a rod 111, arranged in a coaxial relation with the screw 109, which extends through an opening 112 in the leg 107. Arranged about the rod 111, between the screw 109 and the leg 107 is a spring 113 which biases the leg 107 and the bar 103 forwardly.

In the operation of the assembly 10a with the device 101, the fish line 102 is coiled several times about the bar 103 at a position adjacent the knob 104. The ends of the fish line 116 are, of course, connected to the reel 12 and a fish hook (not shown).

The pressure exerted on the leg 107 by the spring 113 is sufficient to hold the convex upper face 117 of the bar portion 106 in contact with the flashlight button 65. However, this spring pressure is not great enough to move the bar portion 106 forwardly to an extent necessary to depress the button 65.

When a fish is pulling the line 102, the force of the pull is added to the pressure of the spring 113 on the leg 107 and both of these forces are sufficient to move the bar 103 forwardly in the opening 104. As a result, the flashlight button 65 rides upwardly on the face 117, causing the button 65 to be depressed sufficiently to close the circuit for the bulb 63.

Forward movement of the bar 103 is limited by the engagement of an upright projection or stop 118 on the bar 103 with the finger extension 48a at a moved position of the bar 103 corresponding to a position of the bar portion 106 depressing the button 65. It is of course apparent that the screw 109 is adjustable in the opening 110 to adjust the pressure of the spring 113 on the leg 107. Accordingly, the device 101 may be adjusted to provide for actuating the button 65 in response to a very slight pull on the line 102.

It is seen, therefore, that the spring device 101 is readily operable in response to the pull of a fish on the line 102 to turn on the flash light bulb 63 and thereby signal the fisherman of the presence of the fish on the line 102. The bar 103 does not interfere with normal use of the assembly 10, and in fact facilitates such use since the curved bar portion 106 provides for a convenient manual operation of the flashlight button 65.

Although the invention has been described with respect to several embodiments thereof, it is understood that it is not to be so limited, since changes can be made therein which are within the full intended scope of this invention as defined by the appended claim.

I claim:

A handle and flashlight assembly for fishing rods comprising a tubular handle member, a flexible stationary contact arranged at one end of said handle member, a spring biased movable contact arranged in a spaced relation with said flexible contact, a flashlight bulb in circuit with said contacts, a flashlight barrel and battery assembly arranged within said handle member and having a bulb socket and a contact at the base of said socket at one end of said barrel and battery assembly, with said movable contact being engageable with the contact at the base of said socket and said flexible contact being engageable with said socket, whereby said bulb may be energized from said barrel and battery assembly.

References Cited in the file of this patent

UNITED STATES PATENTS

| | | |
|---|---|---|
| D. 162,319 | La Falce | Mar. 6, 1951 |
| 1,617,793 | Compton et al. | Feb. 15, 1927 |
| 1,720,228 | Malum | July 9, 1929 |
| 1,798,079 | Gilbert | Mar. 24, 1931 |
| 2,506,370 | Leyda | May 2, 1950 |
| 2,646,640 | George | July 28, 1953 |

FOREIGN PATENTS

| | | |
|---|---|---|
| 178,135 | Germany | July 15, 1935 |